United States Patent
Hunter et al.

(10) Patent No.: US 6,810,111 B1
(45) Date of Patent: Oct. 26, 2004

(54) SYSTEM AND METHOD FOR MEASURING INTERACTIVE VOICE RESPONSE APPLICATION EFFICIENCY

(75) Inventors: Phillip W. Hunter, Plano, TX (US); Jenny Panzarella Burr, Plano, TX (US)

(73) Assignee: InterVoice Limited Partnership, Reno, NV (US)

( * ) Notice: Subject to any disclaimer, the term of this patent is extended or adjusted under 35 U.S.C. 154(b) by 31 days.

(21) Appl. No.: 09/888,683

(22) Filed: Jun. 25, 2001

(51) Int. Cl.[7] .............................................. H04M 1/24
(52) U.S. Cl. ................................... 379/1.02; 379/67.1
(58) Field of Search ............................ 379/1.02, 10.03, 379/67.1, 88.08, 88.16, 88.1, 201.03, 88.09

(56) References Cited

U.S. PATENT DOCUMENTS

| | | | | |
|---|---|---|---|---|
| 5,583,965 A | * | 12/1996 | Douma et al. .............. 704/275 |
| 5,822,397 A | * | 10/1998 | Newman .................. 379/27.02 |
| 5,835,565 A | * | 11/1998 | Smith et al. .............. 379/27.04 |
| 6,366,879 B1 | * | 4/2002 | Coxhead et al. ............. 704/201 |
| 6,400,807 B1 | * | 6/2002 | Hewitt et al. ............. 379/88.11 |
| 6,405,149 B1 | * | 6/2002 | Tsai et al. .................. 702/119 |
| 6,405,170 B1 | * | 6/2002 | Phillips et al. .............. 704/270 |
| 6,516,051 B2 | * | 2/2003 | Sanders ................... 379/10.03 |
| 6,598,022 B2 | * | 7/2003 | Yuschik ...................... 704/275 |
| 2002/0069064 A1 | * | 6/2002 | Dejaco et al. .............. 704/270 |
| 2002/0077819 A1 | * | 6/2002 | Girardo ...................... 704/260 |

* cited by examiner

*Primary Examiner*—Scott L. Weaver
(74) *Attorney, Agent, or Firm*—Fulbright & Jaworski L.L.P.

(57) ABSTRACT

The present invention relates generally to monitoring performance of interactive automated customer applications and more particularly to monitoring performance of an interactive voice response (IVR) system. The present invention monitors IVR state changes in an IVR application. The present invention appends IVR state changes to a history log to allow performance monitoring. Specifically, the present invention logs successful goal completion states (in addition to other information) in the history log where successful goal completion states are associated with a plurality of events associated with said IVR application.

24 Claims, 2 Drawing Sheets

SYSTEM AND METHOD FOR MEASURING INTERACTIVE VOICE RESPONSE APPLICATION EFFICIENCY

TECHNICAL FIELD

The present invention relates generally to monitoring performance of interactive automated customer applications and more particularly to monitoring performance of an interactive voice response (IVR) system.

BACKGROUND

Interactive voice response (IVR) systems allow an individual to interact with a database related system to acquire information and/or perform transactions associated with the database by telephone and/or by other data networks such as the Internet. IVR systems allow transactions to occur without interaction with user agents. For example, banks and credit card companies use IVR systems so that their customers can receive up-to-date account information instantly and easily without having to speak directly to a person.

IVR systems typically receive input information by presenting scripted requests for information to users and allowing users to answer questions either verbally or by pushing the numbers on a touch-tone telephone. Frequently, IVR systems will present a series of menus to a user, allowing the user to select various options. Additionally, users may enter other input information, such as an account number and a personal authorization code. The various menus and requests for input information occur by executing a script or program. Clearly, such scripts or programs can be quite complex.

To determine how well an IVR application is serving callers, IVR systems have utilized frequency analysis. Specifically, IVR applications measure the number of times that specific options are selected. For example, a banking IVR application may measure the number of times that customers select menu options associated with account balance inquiry, funds transfer, stop payment request, and/or the like. Although this information is useful for analyzing application performance, it is quite limited.

SUMMARY OF THE INVENTION

The present invention is directed to a system and method which analyze how well caller goals are achieved in interactive voice response applications. The IVR applications may accept speech, touch tone, or other inputs. The system and method preferably identify the potential points of the beginning, the completion, the incompletion, and failure of each goal. These points within the application call flow may be selected during the application design. During the programming of the application, certain data about each goal event is preferably specified to be recorded to the application platform storage media. A reporting tool is preferably used to aggregate and summarize the data, giving the efficiency results needed to understand the performance of the IVR application.

The present invention recognizes that caller goals frequently span multiple events. Thus, the present invention is able to analyze how well IVR applications perform with respect to interrelated events of a discrete goal, rather than simply measuring the number of times that a single menu option is selected.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
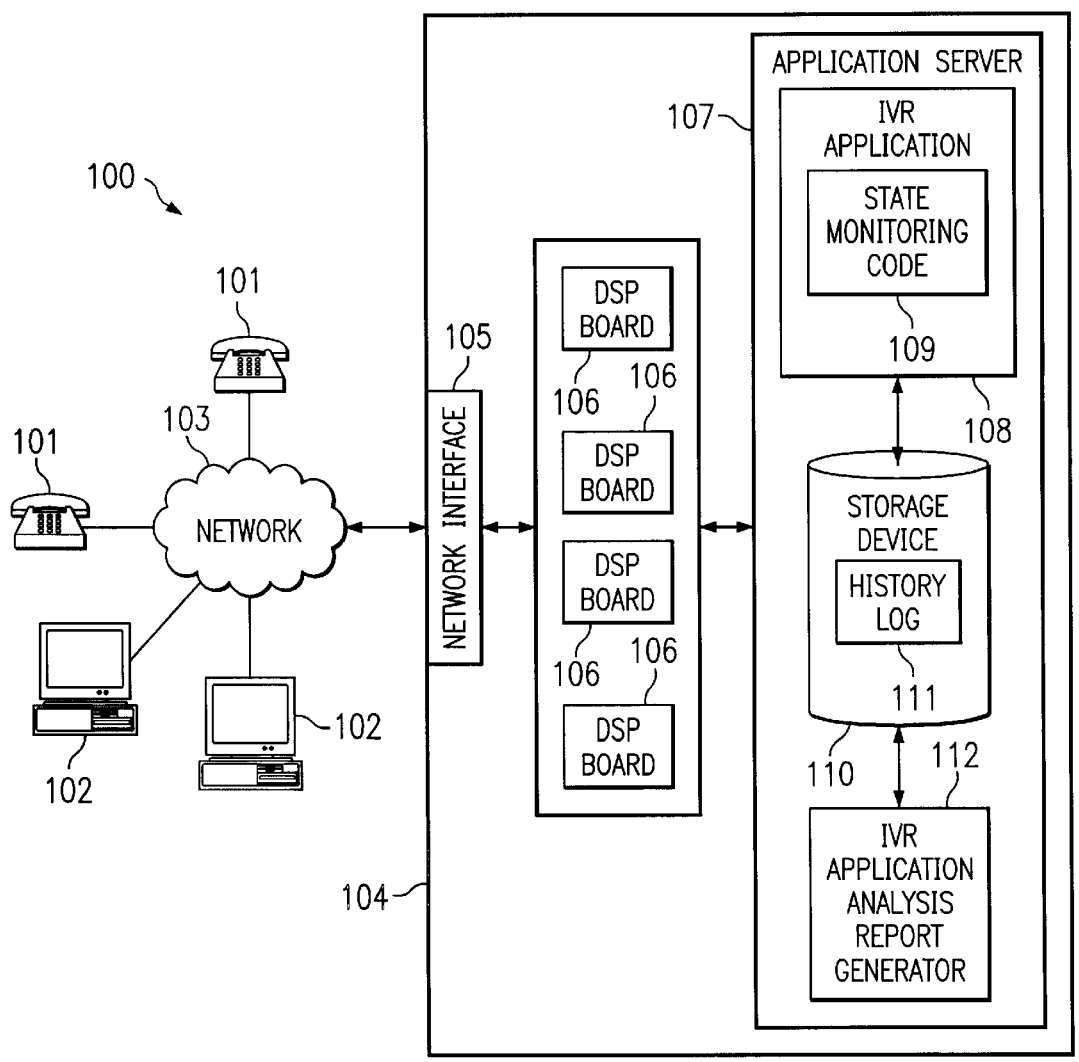
FIG. 1 depicts an exemplary system arrangement according to an embodiment of the present invention.

FIG. 1 depicts an exemplary system arrangement according to an embodiment of the present invention. System 100 includes user devices such as telephones 101 and personal computers 102. The user devices are connected via network 103 to communicate with automated messaging platform 104. Network 103 may be the public switched telephone network (PSTN) or the Internet.

Automated messaging platform 104 includes network interface 105 to connect to network 103. Automated messaging platform 104 comprises a plurality of digital signal processor (DSP) boards 106 to process various communication streams associated with incoming and outgoing communications via network interface 105. Automated messaging platform 104 further comprises application server 107 to implement various automated telephony applications.

The present invention preferably operates in connection with an IVR application that utilizes speech recognition. Algorithmic executable code to process speech data may be executed on the various DSPs of DSP boards 106. For example, executable code for speech recognition may include the steps of: spectral representation, segmentation, phonetic classification, and search and matching utilizing a "n-best" list of predefined lexicographical elements. Additionally, the various DSPs may perform text to speech conversion for communication to the user devices. The various DSPs may execute code to perform various communication protocols to provide multimedia capabilities. For example, executable code to implement various fax applications. Although system automated messaging platform 104 has been depicted to utilize DSP boards 106, other implementations may be utilized. For example, speech and signal processing may occur via software executed on processors associated with application server 107 if desired.

DSP boards 106 are coupled to application server 107. Application server 107 executes various applications that utilize information processed by the respective DSPs of DSP boards 106. Application server 107 is preferably a multi-processor computer system capable of concurrently processing numerous calls. For example, an appropriate UNIX multiprocessor server may be utilized. Application server 107 may comprise a plurality of processors, random access memory (RAM), read only memory (ROM), storage devices, and appropriate user interfaces. Also, application server 107 may execute any number of applications including IVR application 108. IVR application 108 includes state monitoring code which appends state records to history log 111 on storage device 110 according to the present invention.

IVR application 108 allows users associated with the user devices (telephones 101 and PC 102) to obtain information or perform transactions. The users may interact with IVR application 108 utilizing a touch-tone or dual-tone multifrequency (DTMF) user interface. Also, the users may interact with IVR application 108 via voice responses.

IVR application 108 presents to users various options for retrieving information or performing transactions. In response to user input, IVR application 108 responds with desired information, completes the respective transaction, or executes an error process. State monitoring code of IVR application 108 in response to state changes (such a retrieval of desired information, completion of a transaction, or execution of an error process) creates state records which are appended to history log 111. By creating such state records, goal completion information and application efficiency related to IVR application 108 may be analyzed. Thus, IVR application 108 includes IVR application analysis report generator 112. IVR application analysis report generator 112 retrieves information from history log 111, calculates relevant aggregate statistics, and formats the calculated statistics for output to a report file.

It shall be appreciated that system 100 is merely exemplary. The present invention may be practiced utilizing any system architecture suitable for an IVR application. Also, the IVR architecture may be a distributed architecture utilizing numerous system components located in various locations. The present invention may operate with connection with any type of IVR application. For example, state record creation may be associated with banking, medical, or governmental IVR applications. To provide a greater understanding of the present invention, an exemplary banking IVR application shall be discussed. However, it shall be appreciated that the banking IVR application is not intended to limit the present invention.

Figure 2:
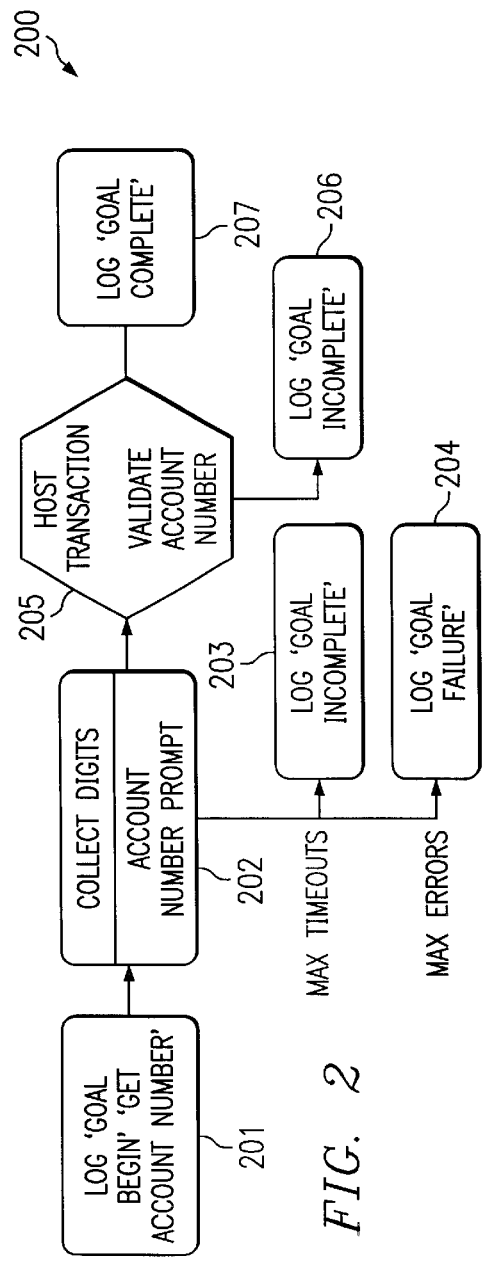
FIG. 2 depicts an exemplary flow chart of IVR states associated with a discrete goal arranged according to the present invention.

FIG. 2 depicts an exemplary flow chart of IVR states arranged according to the present invention. Flow chart 200 defines a series of IVR states for "Get Account Number" goal. Flow chart 200 represents a discrete series of steps or execution states associated with an IVR process or script that obtains a user's account number. The series or execution states may be implemented utilizing an appropriate IVR scripting language. For example, the IVR scripting language may allow an IVR developer to program the IVR script utilizing visual controls via a graphical user interface (GUI). The IVR script may be utilized to generate a high level program to perform the series of steps or execution states. The high level program may then be compiled and linked to generate code executable on application server 107. It shall be appreciated that the code utilized to implement the execution states associated with flow chart 200 may be developed utilizing any development environment. The present invention is not limited to any particular programming language or environment.

Flow chart 200 begins with an initial IVR state. State 201 is the "Goal Begin" state. In this state, the user has been presented with an audio request to enter the customer's account number. Also, at this point, a state record is appended to history log 111 indicating that a user has reached "Goal Begin" state associated with "Get Account Number" goal, i.e., indicating that this particular goal script or process has been initiated. The state flow continues to state 202 where the IVR code attempts to collect the digits from the user. The digits may be provided via a touch-tone of DTMF user interface or a voice interface. After reaching state 202, the state flow may transition to one of three states (states 203, 204, and 205).

If the user does not enter the user's complete account number within a predetermined number of timeouts, an error or incomplete state is reached (state 203). The incomplete state represents that the initiated goal was unable to continue successfully to completion. Preferably, a "Goal Incomplete; No Goal Selected" state record is created to indicate the incompletion of the initiated goal in history log 111.

It shall be appreciated that there is a difference between a goal failure and a goal incompletion. Specifically, a goal incompletion may represent the inability to complete a task due to non-application related issues. A goal failure may be related to the inability to complete a task due to a potential error or deficiency in the application. For example, if an electronic funds transfer is not completed due to insufficient funds in a customer's account, this represents a goal incompletion. However, it is not correlated to any problem with the application. Instead, this indicates that the application is doing exactly what it is designed to do (i.e., prevent an improper transfer of funds). Hence, this type of goal incompletion does not indicate that potential changes should be made to the application.

In this example, if a maximum number of errors in the collecting digits process occurs, state 204 is reached. State 204 represents a goal failure. The goal failure may occur due to any number of reasons such as noise on the communication line associated with the user. Alternatively, voice recognition code or software may be improperly tuned and may contribute to the error. State 204 indicates that there may be a potential issue with the application that could be remedied by modifying the system and/or software. Thus, if a maximum number of error occurs, the flow terminates and a failure is preferably indicated by appending a "Goal Failure; No Goal Selected" record in history log 111.

Assuming that the account number was obtained, state 202 transitions to state 205. At state 205, the input account number is validated. For example, the input account number may be compared to actual account numbers stored in a database. If the account number does not match an account number in the database, state 205 transitions to state 206. State 206 presents another incompletion point of the state flow where a "Goal Incomplete; Get Account Number; Host Problem" state record is appended to history log 111.

If the account number matches an account number in the database, state 205 transitions to state 207. State 207 represents a successful completion of the "Get Account Number" goal, i.e., a valid account number has been received from the user. At state 207, a state record reflecting successful completion of the "Get Account Number" goal is logged in history log 111.

Figure 3:
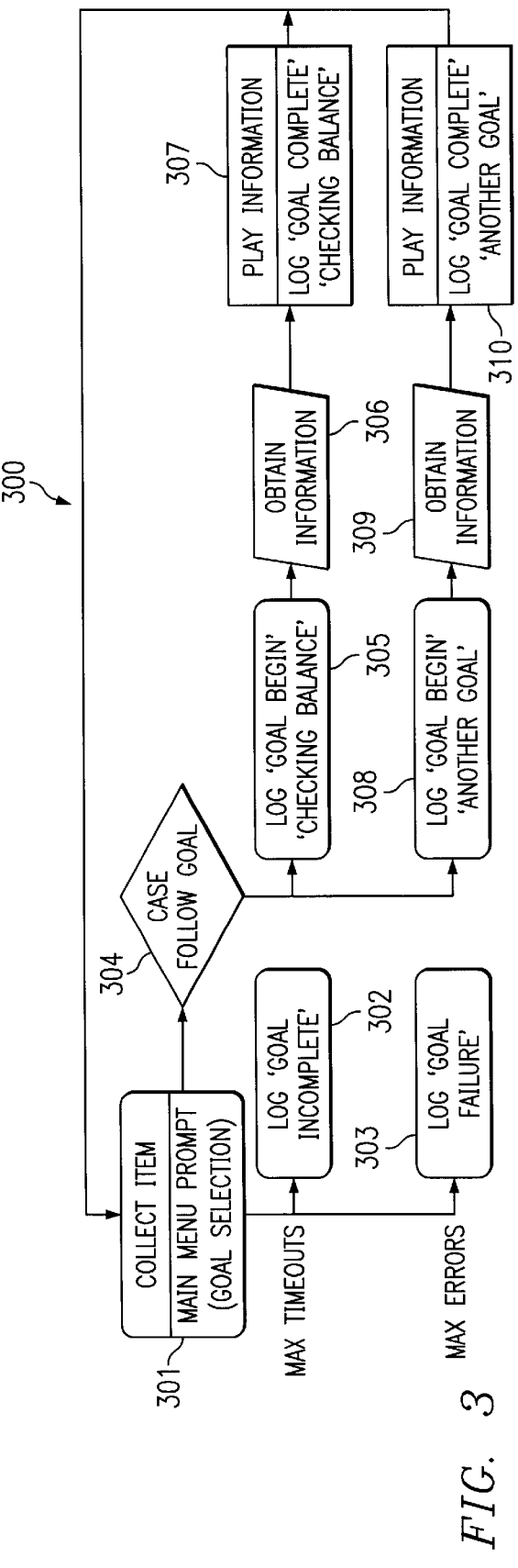
FIG. 3 depicts an exemplary flow chart of IVR states associated with a plurality of goals arranged according to the present invention.

FIG. 3 depicts an exemplary flow chart of IVR states associated with a plurality of discrete goals arranged according to the present invention. Flow chart 300 defines a series of IVR states for an entire IVR application. Flow chart 300 represents discrete series of steps or execution states associated with IVR processes or scripts that perform user initiated transactions. The discrete series or execution states of flow chart 300 may be implemented in the same way that the flow chart 200 may be implemented such as IVR scripting. A user may provide user input via a touch-tone or DTMF user interface or through a voice interface.

Flow chart 300 begins with "Collect Item" state 301. State 301 causes a state record to be appended to history log 111 indicating that a user has reached state 301. Also, a user is provided an audio menu to select a desired goal. State 301 may transition to state 302 if input is not received made within a predetermined amount of timeouts. State 302 will cause a goal incomplete record to be appended to history log 111. State 301 may transition to state 303 if a maximum number of errors occurs. State 303 will cause a goal failure record to be appended to history log 111. When a goal is properly selected via user input, state 304 performs a logical comparison to follow the selected goal by transitioning to the proper state.

If the user selected "Checking Balance" goal, the flow transitions to state 305. At state 305, a state record is logged or appended to history log 111 indicating that the user reached state 305. This may indicate that this particular goal script or process has been initiated. At state 306, user information is obtained. If successful, the flow transitions to state 307. Of course, if user information is not obtained, the flow may terminate due to failure or incompletion. Assuming that user information is obtained, the flow transitions to state 307. At state 307, the checking account information is played to the user and a state record indicating successful completion of "Checking Balance" goal is appended to history log 111. The flow then transitions back to state 301 to allow the user to select other goals if desired.

For example, the user may then select "Another Goal" goal. The flow may then eventually transition to state 308 where a state record indicating that a user has reached state 308 is logged or appended to history log 111. This may indicate that this particular goal script or process has been initiated. State 309 may obtain information from a user. State 310 may play pertinent information and log or append a successful completion state record to history log 111. Of course, it shall be appreciated that any number of goals or user selections may be implemented in this manner. Thus, an IVR application may thereby implement and monitor any number of user options as desired.

It shall be appreciated that flow chart 200 and flow chart 300 are merely exemplary. Any number of states may be utilized. For example, the IVR application may contain several nested menus for user selections. Also, it shall be appreciated that appending state records is not limited to state entry points and successful exit points. In fact, state records may be logged or appended for any type of state changes associated with an IVR application as deemed necessary by application developers. For example, state records may be created for incomplete or unsuccessful goal states. The incomplete or unsuccessful goal state records may provide explanation information such as caller timeout, hang up, command goal (caller selection of a command that terminates goal), data problem, system canceled (business rule disallowing goal, e.g., insufficient funds in account), shortcut (caller selects navigational shortcut to cancel goal), caller canceled explanations.

In an embodiment, the present invention defines data objects associated with discrete goals of an IVR application. The instances of the data objects are appended to history log 111 with state records according to execution of the IVR application. Other information may be included in the state record as such the date, time, reason for incompletion or failure of goal, and/or the like. Exemplary state records, including instances of goal data objects, may utilize the following format:

11212000,12:45:27,CheckingBalance,Begin, CallerSelected.

11212000,12:46:33,CheckingBalance,Complete, CallerSelected.

11212000,1:05:09,TransferFunds,Begin,CallerSelected.

11212000,1:07:09,TransferFunds,EnterAccount, NoSuchAccountNumber.

11212000,1:11:23,StopPayment,Begin,CallerSelected.

11212000,1:13:32,StopPayment,EnterCheckNumber, Timeout.

It shall be appreciated that the preceding are merely exemplary. Any format for state records may be utilized. Additionally, any form of data objection definitions may be utilized. For example, a discrete code may be associated with each IVR application state. The instances related to initialization of goals or completion of goals may be determined utilizing a table look-up operation. The formats and data object definitions do not require any specific characteristics. Instead, the formats and data objects need only provide sufficient information to indicate initialization of discrete goals and completion of said goals.

IVR application analysis report generator 112 retrieves information from history log 111, calculates relevant aggregate statistics, and formats the calculated statistics for an output report file. The report may provide any type of summarized data such as overall goal completion percentage over a defined time period, overall average number of goals completed per call, total number of calls begun, total number of goals begun, total number of goals successfully completed, total number of goals not completed, and/or total number of goals failed. Additionally, the report may provide such information on a goal by goal basis. The report may also segregate information by various criteria such as by date, time, and caller ID if desired. Report generator 112 may be operable to respond to system administrator configuration files to produce desired reports. The configuration files may specify desired specific goals, failure reasons, and/or the like for presentation in a particular report file or files. The report files may be presented to a system administrator via print outs, a graphical user interface (GUI), or any other suitable user interface.

Additionally, it shall be appreciated that several IVR applications may be executed on application server 107. Thus, state records may be appended to history log 111 for each such IVR application. The state records may reflect the originating IVR applications. Also, IVR report application analysis report generator 112 may produce summary information across all such applications and/or on an application by application basis.

It shall be appreciated that the present invention presents numerous advantages. In particular, the present invention recognizes that caller goals frequently span multiple events. Thus, merely tracking quantitative measure of event frequencies does not describe the interrelationship of events related across a common goal. Additionally, the present invention permits a determination of how well an IVR serves customer goals. Also, valuable information may be obtained by analyzing the reasons for goal failure. For example, if an "n-best" voice response prompt consistently exhibits failure, it is possible that the "n-best" options do not accurately reflect the customer's reasons for calling. For example, customers may frequently desire another option, such as obtaining tax information, which is not provided as part of the list of options. Such a repetitive failure of a goal may signal that the respective prompt should be rewritten to reflect customer desires. Alternatively, the signal processing associated with the "n-best" options might not be accurately tuned to perform voice data correlation. Moreover, the repetitive use of a navigation shortcut may cause IVR administrators to reprogram the IVR script to make a desired option appear earlier in the IVR process. Accordingly, the present invention makes a significant amount of customer information available to allow IVR applications to address efficient completion of customer goals.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer readable medium having a computer program thereon for monitoring performance of an interactive voice response (IVR) application, comprising:
    a plurality of goal data object definitions, wherein said goal data object definitions provide information regarding IVR application goals and are associated with discrete goal scripts of said IVR application;
    code for logging an instance of a goal data object associated with a goal script to a file on said data storage medium to indicate initiation of said goal script related to an IVR application goal; and
    code for logging an instance of a goal data object associated with said goal script to a file on said data storage medium to indicate successful completion of said IVR application goal.

2. The computer readable medium of claim 1 further comprising:
    code for logging an instance of a goal data object associated with said goal script to a file on said data storage medium to indicate incompletion of said IVR application goal.

3. The computer readable medium of claim 1 further comprising:
    code for logging an instance of a goal data object associated with said goal script to a file on said data storage medium to indicate failure of said IVR application goal.

4. The computer readable medium of claim 2 wherein said instance associated with incompletion of said goal script identifies the cause of said incompletion as a caller timeout.

5. The computer readable medium of claim 2 wherein said instance associated with incompletion of said goal script identifies the cause of said incompletion as a business rule prohibition.

6. The computer readable medium of claim 2 wherein said instance associated with incompletion of said goal script identifies the cause of said incompletion as a navigational shortcut.

7. A computer readable medium having a computer program thereon for monitoring performance of an interactive voice response (IVR) application, comprising:
    a plurality of goal data object definitions, wherein said goal data object definitions provide information regarding IVR application goals and are associated with discrete goal scripts of said IVR application;
    code for logging an instance of a goal data object associated with a goal script to a file on said data storage medium to indicate initiation of said goal script related to an IVR application goal;
    code for logging an instance of a goal data object associated with said goal script to a file on said data storage medium to indicate successful completion of said IVR application goal; and
    code for generating report statistics by determining a total number of goal scripts begun and a total number of goal scripts successfully completed over a time period utilizing instances of data objects stored on said data storage medium.

8. The computer readable medium of claim 7 further comprising:
    code for generating report statistics by determining a total number of goals not completed utilizing instances of data objects stored on said data storage medium.

9. A method for monitoring performance of an interactive voice response (IVR) application, comprising:
    initiating an IVR goal script related to an IVR application goal;
    updating a history file to indicate that said IVR goal script has been initiated;
    monitoring IVR input from a user for at least one input prompt to determine whether proper input data has been received; and
    when proper input data has been received, updating a history file to indicate that said IVR application goal has been successfully completed.

10. The method of claim 9 further comprising:
    calculating a first total number of goal scripts initiated;
    calculating a second total number of goal scripts completed successfully; and
    generating report statistics utilizing said first total number and said second total number.

11. A method for monitoring performance of an interactive voice response (IVR) application, comprising:
    initiating an IVR goal script related to an IVR application goal;
    updating a history file to indicate that said IVR goal script has been initiated;
    monitoring IVR input from a user for at least one input prompt to determine whether proper input data has been received;
    when proper input data has been received, updating a history file to indicate that said IVR application goal-has been successfully completed; and when proper input data has not been received, updating a history file to indicate a reason for not receiving proper input data.

12. The method of claim 11 wherein said at least one input prompt is a voice prompt for one of a plurality of voice response options.

13. The method of claim 12 wherein said reason for not receiving is failure to correlate to an option of said plurality of voice response options.

14. The method of claim 11 wherein said reason for not receiving is a caller timeout.

15. The method of claim 11 wherein said reason for not receiving is a business rule prohibition.

16. The method of claim 11 wherein said reason for not receiving is a navigational shortcut.

17. The method of claim 11 wherein said reason for not receiving is a failure due a maximum number of errors in received data.

18. The method of claim 11 further comprising:
calculating a first total number of goal scripts initiated;
calculating a second total number of goal scripts not successfully completed; and
generating report statistics utilizing said first total number and said second total number.

19. A system for monitoring performance of an interactive voice response (IVR) application, comprising:
an interface to a communication network;
a plurality of signal processing units operable to process communication signals from said communication network, wherein said signal processing units are operable to process touch tone signals and voice signals; and
an application server operable to execute an IVR application responsive to communication signals from said communication network, wherein said IVR application includes a first software algorithm operable to generate records when a goal script of said IVR application is initiated in response to communications signals from said communication network, and wherein said IVR application further includes a second software algorithm operable to generate records when said goal script is successfully completed in response to communication signals from said communication network.

20. The system of claim 19 further including:
a data storage medium for storing generated records associated with said goal script.

21. The system of claim 20 wherein said IVR application further comprises a third software algorithm operable to record a reason for unsuccessful completion of said goal script.

22. The system of claim 21 wherein said reason for unsuccessful completion is failure to correlate voice signals to a proper input of a list of possible voice inputs.

23. The system of claim 19 wherein said IVR application further comprises a report generating algorithm operable to calculate a total number of initiations of said goal script and a total number of successful completions of said goal script.

24. A system for monitoring performance of an interactive voice response (IVR) application, comprising:
an interface to a communication network;
a plurality of signal processing units operable to process communications associated with said communication networks, wherein signal processors of said plurality of signal processors are operable to correlate voice communications to a list of permissible voice selections in association operation of said IVR application;
an application server executing said IVR application, said IVR application including:
code for presenting an initial menu option to a user;
code for receiving first user input received from said interface to said communication network and processed by a signal processor of said plurality of signal processors;
code for initiating a goal script in response to said first user input;
code for appending a state record to a history log indicating initiation of said goal script;
code for receiving second user input received from said interface to said communication network and processed by a signal processor of said plurality of signal processors;
code for determining whether said received second user input is proper;
code for appending a state record to said history log when said user input is proper to indicate successful completion of said goal script; and
code for appending a state record to said history log when said user input is improper to indicate a reason for said improper input, wherein reasons for improper input include input timeout, failure to correlate to one of a list of permissible voice selections, and business rule prohibition;
a report generation application for calculating goal statistics from state records in said history log and formatting said goal statistics for output; and
a data storage medium for storing said history log.

* * * * *